United States Patent
Petton

(10) Patent No.: US 8,463,974 B2
(45) Date of Patent: Jun. 11, 2013

(54) SYSTEM AND METHOD FOR DISPLAYING INFORMATION REGARDING AN UNENGAGED PLUG-IN UNIT

(75) Inventor: David Paul Petton, Garland, TX (US)

(73) Assignee: Fujitsu Limited, Kawasaki-shi (JP)

( * ) Notice: Subject to any disclaimer, the term of this patent is extended or adjusted under 35 U.S.C. 154(b) by 264 days.

(21) Appl. No.: 12/952,028

(22) Filed: Nov. 22, 2010

(65) Prior Publication Data
US 2012/0131600 A1     May 24, 2012

(51) Int. Cl.
*G06F 3/00* (2006.01)
*G06F 13/00* (2006.01)
*H05K 7/10* (2006.01)

(52) U.S. Cl.
USPC ............... 710/301; 710/13; 710/19; 710/302; 710/303; 710/304

(58) Field of Classification Search
USPC ...................... 710/19, 301–304, 13
See application file for complete search history.

(56) References Cited

U.S. PATENT DOCUMENTS

| | | | |
|---|---|---|---|
| 6,532,587 B1 * | 3/2003 | Sakai et al. .................... | 717/168 |
| 2005/0246492 A1 * | 11/2005 | Robinson ...................... | 711/115 |
| 2006/0208092 A1 * | 9/2006 | Winkler ........................ | 235/492 |
| 2007/0115761 A1 * | 5/2007 | Song .......................... | 369/13.01 |
| 2007/0176912 A1 * | 8/2007 | Beames et al. ................ | 345/204 |

* cited by examiner

*Primary Examiner* — Farley Abad
(74) *Attorney, Agent, or Firm* — Baker Botts L.L.P.

(57) ABSTRACT

In accordance with embodiments of the present disclosure, methods and systems for displaying information regarding an unengaged plug-in unit are provided. A plug-in unit may include a processor and an information verification module communicatively coupled to the processor. The information verification module may include a non-volatile memory, a controller communicatively coupled to the non-volatile memory, and display communicatively coupled to the controller. The a non-volatile memory may store information. The controller may be configured to, when the plug-in unit is unengaged: (i) read the information from the non-volatile memory, and (ii) communicate control signals based at least in part on the read information. The display may be configured to, when the plug-in unit is unengaged, display graphic images or alphanumeric characters based at least in part on the control signals.

8 Claims, 2 Drawing Sheets

SYSTEM AND METHOD FOR DISPLAYING INFORMATION REGARDING AN UNENGAGED PLUG-IN UNIT

TECHNICAL FIELD OF THE INVENTION

The present invention relates generally to computing devices and, more particularly, to a method and system for displaying information regarding an unengaged plug-in unit.

BACKGROUND

Computing systems typically employ numerous modular devices, including motherboards and peripheral cards. Such modular devices are sometime referred to as "plug-in units." Such a plug-in unit or PIU may comprise a printed circuit board having one or more electronic components (e.g., integrated circuits, transistors, resistors, inductors, capacitors, etc.) mounted thereon in order to perform a desired function. In operation, a PIU typically draws power from a power bus of a chassis, shelf, or other enclosure in which the PIU is mounted.

A PIU may include embedded software and/or firmware stored in the memory of the PIU that adds to and/or enhances the functionality of the device, and/or allows the PIU to interact with other devices (including, without limitation, other PIUs). Oftentimes, to ensure desired functionality and/or ability to interact with other devices, it is critical that the embedded software and/or firmware be of one or more desired release versions. For example, in many applications, a plurality of PIUs with similar or identical functionality may be used as part of the same modular system (e.g., multiple server blades in a chassis, multiple line cards in a chassis, etc.). In these applications, the plurality of PIUs may not interact correctly unless they all include the same (or compatible) software and/or firmware versions.

Traditionally, verifying the identity of software and/or firmware release versions for PIUs requires installing or mounting (e.g., "plugging in") the PIU into a system configured to receive the PIU (e.g., a chassis, shelf, enclosure, or test equipment). This installation or mounting may couple the PIU to power and communications busses, which may allow the PIU to communicate information regarding its software and/or firmware release versions to other devices and/or a person. Thus, traditionally, individuals do not have the ability to determine software and/or firmware version information of a PIU without installing or mounting the PIU into a system configured to receive the PIU. This may prove problematic in situations in which an administrator, technician, and/or other person at a site desires to install multiple PIUs. If one or more of the PIUs carries software and/or firmware mismatched from the other PIUs, the set of PIUs may not be operable together, requiring an upgrade to the PIU set which may be costly and/or time consuming. Thus, it is desirable to verify matching or compatible software/firmware versions prior to delivery to the site, without the time-consuming need of plugging in each member of the PIU set to determine version information.

SUMMARY

In accordance with embodiments of the present disclosure, a plug-in unit may include a processor and an information verification module communicatively coupled to the processor. The information verification module may include a non-volatile memory, a controller communicatively coupled to the non-volatile memory, and display communicatively coupled to the controller. The non-volatile memory may store information. The controller may be configured to, when the plug-in unit is unengaged: (i) read the information from the non-volatile memory, and (ii) communicate control signals based at least in part on the read information. The display may be configured to, when the plug-in unit is unengaged, display graphic images or alphanumeric characters based at least in part on the control signals.

Technical advantages of one or more embodiments of the present invention may include methods and systems whereby a plug-in unit may display information regarding the plug-in unit, including software version release and/or firmware version release information, even in instances in which the plug-in unit is unengaged.

It will be understood that the various embodiments of the present invention may include some, all, or none of the enumerated technical advantages. In addition, other technical advantages of the present invention may be readily apparent to one skilled in the art from the figures, description and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Figure 1:
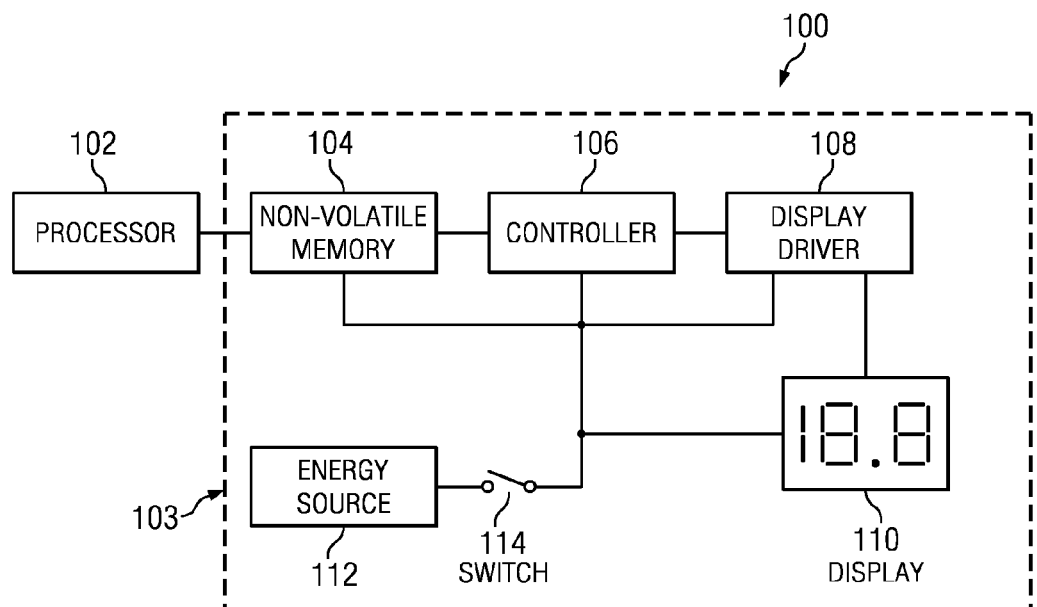
FIG. 1 illustrates a block diagram of selected components of an example plug-in unit including an information display module, in accordance with embodiments of the present disclosure.

FIG. 1 illustrates a block diagram of selected components of an example plug-in unit (PIU) 100 including an information display module 103, in accordance with embodiments of the present disclosure. PIU 100 may comprise a modular electronic device that provides any suitable communication functionality. PIU 100 may include plug-in terminals or other connectors so that electrical and/or communicative coupling of PIU 100 to other devices can be made engaging PIU 100 with a suitable socket of an apparatus configured to receive PIU 100 (e.g., a chassis, shelf, enclosure, or test equipment). PIU 100 may include, among other things, a motherboard, a server blade, a peripheral card, a line card, a switch, other printed circuit board, or any other electronic device.

As shown in FIG. 1, PIU 100 may include a processor 102 and an information display module 103. Processor 102 may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data.

Information display module 103 may include a system, device, or apparatus configured to display information regarding PIU 100 (e.g., software release version, firmware release version) while PIU 100 is unengaged. For the purposes of this disclosure "unengaged" may mean that PIU 100 is not installed, mounted, plugged in, or otherwise engaged with an apparatus (e.g., a chassis, shelf, enclosure, or test equipment) configured to receive PIU 100 and provide to PIU 100 connectors to electrically and/or communicatively couple PIU 100 to other devices. As shown in FIG. 1, information display module 103 may include a non-volatile memory 104, a controller 106, a display driver 108, a display 110, an energy source 112, and a switch 114.

Non-volatile memory 104 may be communicatively coupled to processor 102 and may include any system, device, or apparatus configured to retain program instructions and/or data for a period of time (e.g., computer-readable media), and may retain data while PIU 100 is unengaged, not coupled to a power source external to PIU 100, or not receiving electrical energy from a power source external to PIU 100. For example, non-volatile memory 104 may comprise flash memory, programmable read-only memory, traditional volatile memory coupled to an energy source internal to PIU 100 (e.g., a battery), or any other suitable type of memory.

Controller 106 may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, controller 106 may be of lesser complexity and functionality than processor 102 (e.g., controller 106 may be an 8-bit microcontroller while processor 102 may be a 64-bit processor). For example, controller 106 may be configured to read data from non-volatile memory 104 and communicate control signals to display driver 108, but may have little or no additional functionality, while processor 102 may generally be configured to undertake significantly more functionality with respect to the operation of PIU 100.

Display driver 108 be communicatively coupled to controller 106 and may include any system, device, or apparatus configured to receive data from controller 106 and based on such received data, communicate control signals to display 110. As an example, display driver 108 may comprise one or more seven-segment display drivers configured to translate data received from controller 106 to signals for driving segments of one or more seven-segment displays.

Display 110 may be communicatively coupled to controller 106 and may include any system, device or apparatus suitable for creating graphic images and/or alphanumeric characters recognizable to a person. In some embodiments, display 110 may include one or more seven-segment displays (as depicted in FIG. 1) or similar type displays (e.g., fourteen-segment displays, sixteen-segment displays, dot matrix displays, etc.). Display 110 may display graphic images and/or alphanumeric characters based on signals communicated by controller 106 and/or display driver 108. Although FIG. 1 depicts display 110 communicatively coupled to controller 106 via display driver 108, some embodiments of information display module 103 may not include display driver 108 (such that display 110 is coupled to controller 106 without an intervening display driver 108) while other embodiments of information display module 103 may include controller 106 integrated with display driver 108 (such that display 110 is coupled to the integrated controller/driver).

Energy source 112 may include any system, device, or apparatus configured to and provide electrical energy in the form of an electrical current to one or more components of information display module 103. Energy source 112 may be internal to PIU 100, such that components of information display module 103 (e.g., non-volatile memory 104, controller 106, display driver 108, driver 110) may receive electrical current from energy source 112 when PIU 100 is unengaged and unable to receive electrical current from an energy source external to PIU 100. In some embodiments, energy source 112 may include one or more batteries that store electrochemical energy (e.g., one or more button cells or coin batteries). In other embodiments, energy source 112 may include a photovoltaic cell capable of converting energy present in ambient light into electrical energy. In these and other embodiments, energy source 112 may include one or more components for regulating or controlling properties of the electrical current produced by energy source 112. For example, in embodiments in which energy source 112 comprises a button cell battery, energy source 112 may include a voltage boost regulator to increase the voltage generated by the button cell (e.g., from 1.5 volts to 3.3 volts or 5 volts) so that adequate voltage is supplied to components of information display module 103.

Switch 114 may include any system, device, or apparatus configured to selectively conduct or interrupt electrical current from energy source 112 based on whether switch 114 is opened (creating an open circuit such that electrical current from energy source 112 is interrupted) or closed (created a closed circuit such that electrical current from energy source 112 is conducted. In some embodiments, switch 114 be configured for operation by a person (e.g., a toggle switch, press button, etc.).

In operation, when PIU 100 is engaged (e.g., in a chassis, shelf, enclosure, or test equipment), processor 102 may write information to non-volatile memory 104 including a software release version, firmware release version, or other information and may also charge/recharge energy source 112 when PIU 100 is engaged (via the chassis, shelf, enclosure or test equipment's power bus). Accordingly, to determine information regarding PIU 100 (e.g., software release version, firmware release version, etc.), a person may activate switch 114 (e.g., by toggling a toggle switch or depressing a button). Activation of the switch may close switch 114 such that electrical current from energy source 112 is conducted to non-volatile memory 104, controller 106, display driver 108, and/or display 110. Once supplied with electrical energy, controller 106 may read information from non-volatile memory 104 (e.g., software release version, firmware release version, etc.) and based on the read information, communicate control signals to display driver 108 and/or display 110 to display information (e.g., software release version number, firmware release version number, etc.) on display 110. In some embodiments, controller 106 may be configured or programmed to cause display 110 to serially display information to display 110 (e.g., controller 106 may cause a software release version number to be displayed after one activation of switch 114 and cause a firmware version number to be displayed after two activations of switch 114).

Although the foregoing has concentrated on displaying software and firmware version numbers to a person using information display module 103, it is understood that the methods and systems herein may apply to any and all types of information, including, without limitation, the PIU 100 serial number, date-of-manufacture (DOM), the related industry's governing-body codes assigned to PIU 100, fault/no-fault status of PIU 100 or a specific fault alarm code, etc.

Figure 2:
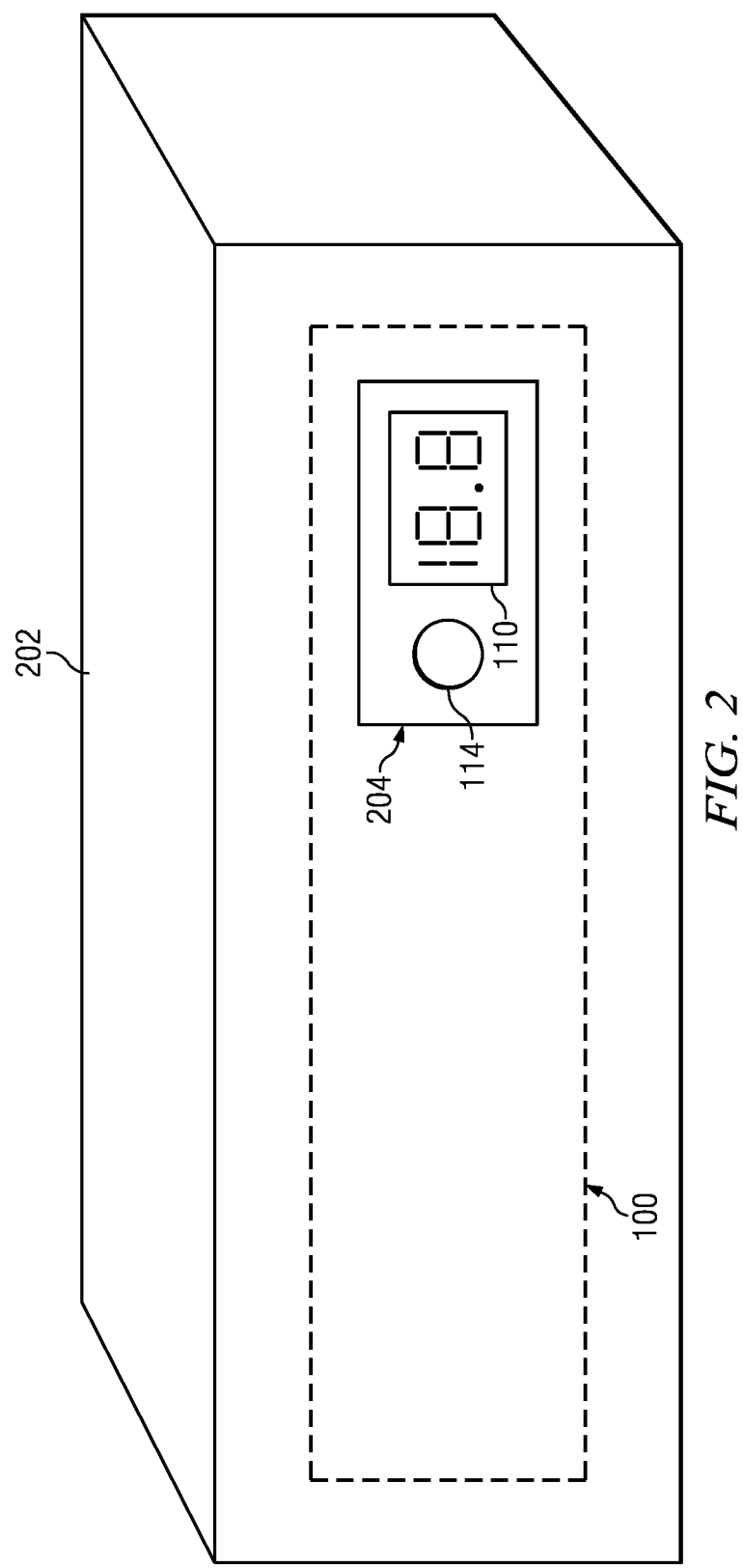
FIG. 2 illustrates a shipping container for the plug-in unit depicted in FIG. 1, in accordance with embodiments of the present disclosure.

FIG. 2 illustrates a shipping container 202 for PIU 100, in accordance with embodiments of the present disclosure. As shown in FIG. 2, shipping container 202 may include an opening 204 sized and shaped so to allow a person tactile access to switch 114 and visual access to display 110 while the remainder of PIU 100 is packaged inside shipping container 202. Thus, a person may, without opening shipping container 202, activate switch 114 causing information to be displayed on display 110, and read the information from display 110. For instance, in some embodiments a person may depress a momentary switch (e.g., switch 114) on PIU 100 (via container opening 204) through a sealed, transparent electrostatic discharge (ESD) bag in which PIU 100 would be shipped (thus allowing for visibility of display 10, through the transparent ESD bag via container opening 204).

Figure 3:
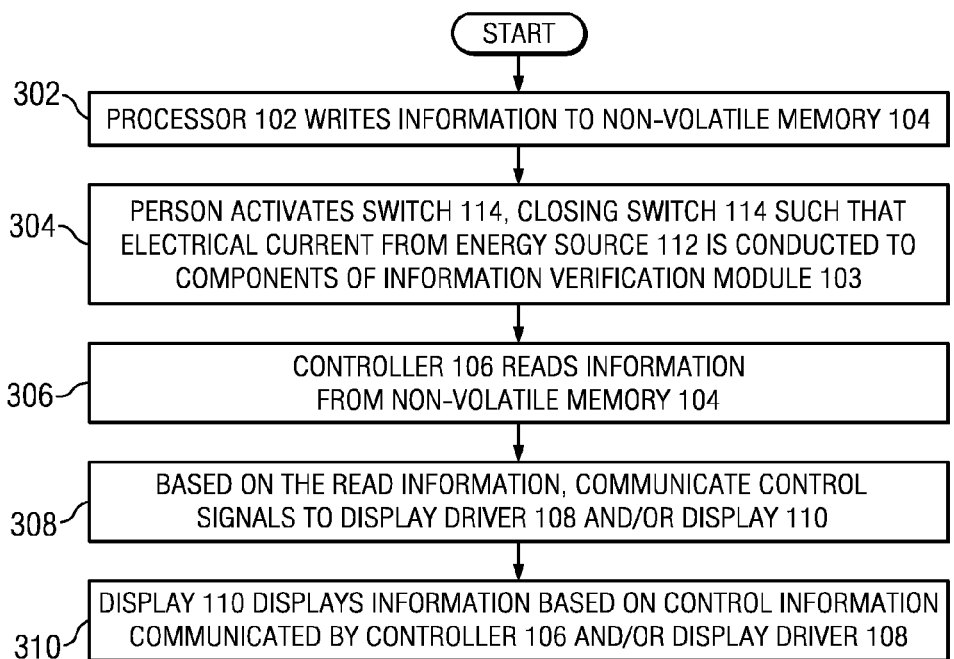
FIG. 3 depicts a flow chart of an example method for using information display module depicted in FIG. 1, in accordance with embodiments of the present disclosure.

FIG. 3 depicts a flow chart of an example method 300 for using information display module 103 depicted in FIG. 1, in accordance with embodiments of the present disclosure. According to one embodiment, method 300 may begin at step 302. As noted above, teachings of the present disclosure may be implemented in a variety of configurations of PIU 100. As such, the preferred initialization point for method 300 and the order of the steps 302-310 comprising method 300 may depend on the implementation chosen.

At step 302, with PIU 100 engaged (e.g., in a chassis, shelf, enclosure, or test equipment providing electrical current to processor 102 and other components of PIU 100 from an energy source external to PIU 100), processor 102 may write information to non-volatile memory 104 including a software release version, firmware release version, or other information.

At step 304, a person may activate switch 114 (e.g., by toggling a toggle switch or depressing a button). Activation of the switch may close switch 114 such that electrical current from energy source 112 is conducted to non-volatile memory 104, controller 106, display driver 108, and/or display 110.

At step 306, controller 106 may read information from non-volatile memory 104 (e.g., software release version, firmware release version, etc.)

At step 308, based on the read information, controller 106 may communicate control signals to display driver 108 and/or display 110.

At step 310, display 110 may display information (e.g., software release version number, firmware release version number, etc.) based on control information communicated by controller 106 and/or display driver 108.

Although FIG. 3 discloses a particular number of steps to be taken with respect to method 300, method 300 may be executed with greater or lesser steps than those depicted in FIG. 3. In addition, although FIG. 3 discloses a certain order of steps to be taken with respect to method 300, the steps comprising method 300 may be completed in any suitable order. In addition, the steps comprising method 300 may be repeated, independently and/or collectively, as often as desired or required by a chosen implementation.

Method 300 may be implemented using PIU 100 or any other system operable to implement method 300. In certain embodiments, method 300 may be implemented partially or fully in software and/or firmware embodied in computer-readable media.

A component of PIU 100 may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Logic may be encoded in one or more tangible computer readable storage media and may perform operations when executed by a computer. Certain logic, such as a processor, may manage the operation of a component. Examples of a processor include one or more computers, one or more microprocessors, one or more applications, and/or other logic.

Modifications, additions, or omissions may be made to PIU 100 without departing from the scope of the invention. The components of PIU 100 may be integrated or separated. Moreover, the operations of PIU 100 may be performed by more, fewer, or other components. Additionally, operations of memory controller may be performed using any suitable logic. As used in this document, "each" refers to each member of a set or each member of a subset of a set.

Although the present invention has been described with several embodiments, various changes and modifications may be suggested to one skilled in the art. It is intended that the present invention encompass such changes and modifications as fall within the scope of the appended claims.

What is claimed is:

1. A plug-in unit comprising:
a plug-in connector configured to plug into a socket of an electronics shelf, the electronics shelf configured to receive a plurality of plug-in units, the socket configured to couple the plug-in unit to power and communications busses of the electronics shelf, the power and communications busses coupling the plurality of plug-in units received into the electronics shelf;
a processor; and
an information verification module communicatively coupled to the processor, the information verification module comprising:
a non-volatile memory for storing information, the information including at least one of a software release version number and a firmware release version number associated with the plug-in unit;
a controller communicatively coupled to the non-volatile memory and configured to, when the connector of the plug-in unit is not plugged into the socket of the electronics shelf:
read the information from the non-volatile memory; and
communicate control signals based at least in part on the read information; and
a display communicatively coupled to the controller and configured to, when the connector of the plug-in unit is not plugged into the socket of the electronics shelf, display graphic images or alphanumeric characters associated with the software release version number or firmware release version number based at least in part on the control signals.

2. A plug-in unit according to claim 1, the processor configured to write the information to the non-volatile memory when the connector of the plug-in unit is plugged into the socket of the electronics shelf.

3. A plug-in unit according to claim 1, the information verification module further comprising an energy source internal to the plug-in unit configured to provide electrical energy in the form of an electrical current to at least one or the non-volatile memory, the controller, and the display when the connector of the plug-in unit is not plugged into the socket of the electronics shelf.

4. A plug-in unit according to claim 3, the energy source comprising a battery.

5. A plug-in unit according to claim 3, the energy source comprising a photovoltaic cell.

6. A plug-in unit according to claim 3, the information verification module further comprising a switch configured to be activated by a person such that, when activated, the switch conducts electrical current from the energy source to at least one or the non-volatile memory, the controller, and the display.

7. A plug-in unit according to claim 1, the information verification module further comprising a display driver interfaced between the controller and the display and configured to translate signals communicated by the controller into signals for driving the display.

8. A method for communicating information relevant to an unengaged plug-in card, comprising:
   receiving a plurality of plug-in units, each plug-in unit comprising:
      a plug-in connector configured to plug into a socket of an electronics shelf, the electronics shelf configured to receive a plurality of plug-in units, the socket configured to couple the plug-in unit to power and communications busses of the electronics shelf, the power and communications busses coupling the plurality of plug-in units received into the electronics shelf;
      a processor; and
      an information verification module communicatively coupled to the processor, the information verification module comprising:
         a non-volatile memory for storing information, the information including at least one of a software release version number and a firmware release version number associated with the plug-in unit;
         a controller communicatively coupled to the non-volatile memory and configured to, when the connector of the plug-in unit is not plugged into the socket of the electronics shelf:
            read the information from the non-volatile memory; and
            communicate control signals based at least in part on the read information; and
         a display communicatively coupled to the controller and configured to, when the connector of the plug-in unit is not plugged into the socket of the electronics shelf, display graphic images or alphanumeric characters associated with the software release version number or firmware release version number based at least in part on the control signals;
   reading the display of each of the plurality of plug-in units while the plug-in unit is not plugged into the socket of the electronics shelf to determine the software release version number or firmware release version number of the plug-in unit; and
   verifying that the software release version numbers or firmware release version numbers of the plurality of plug-in units are compatible.

* * * * *